(12) United States Patent
Jiang

(10) Patent No.: US 12,140,427 B2
(45) Date of Patent: *Nov. 12, 2024

(54) METERING ADJUSTMENT METHOD, APPARATUS AND DEVICE AND STORAGE MEDIUM

(71) Applicant: AUTEL ROBOTICS CO., LTD., Guangdong (CN)

(72) Inventor: Defei Jiang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 287 days.

This patent is subject to a terminal disclaimer.

(21) Appl. No.: 17/652,746

(22) Filed: Feb. 28, 2022

(65) Prior Publication Data
US 2022/0236056 A1 Jul. 28, 2022

Related U.S. Application Data

(63) Continuation of application No. PCT/CN2020/123052, filed on Oct. 23, 2020.

(30) Foreign Application Priority Data

Aug. 28, 2019 (CN) .......................... 201910804195.8

(51) Int. Cl.
G01C 11/16 (2006.01)
G01C 11/02 (2006.01)
G01C 11/26 (2006.01)
G05D 1/00 (2006.01)

(52) U.S. Cl.
CPC .............. *G01C 11/16* (2013.01); *G01C 11/02* (2013.01); *G01C 11/26* (2013.01); *G05D 1/101* (2013.01)

(58) Field of Classification Search
None
See application file for complete search history.

(56) References Cited

U.S. PATENT DOCUMENTS

2011/0150284 A1* 6/2011 Son .......................... G06T 7/215
382/103
2012/0237195 A1 9/2012 Masuyama

FOREIGN PATENT DOCUMENTS

| CN | 1577034 A | 2/2005 |
|---|---|---|
| CN | 1912728 A | 2/2007 |
| CN | 101272458 A | 9/2008 |
| CN | 101800859 A | 8/2010 |

(Continued)

OTHER PUBLICATIONS

PCT International Search Report mailed Jan. 26, 2021; PCT/CN2020/123052 with English translation.

*Primary Examiner* — Mishawn N. Hunter
(74) *Attorney, Agent, or Firm* — Frank Gao, Esq.

(57) ABSTRACT

Embodiments of the present invention discloses a metering adjustment method, apparatus and device and a storage medium. The method includes: acquiring brightness information of a current image frame and a previous image frame captured by a shooting apparatus of an unmanned aerial vehicle (UAV); determining whether the brightness information of the current image frame changes relative to the brightness information of the previous image frame; if so, acquiring motion state information of the shooting apparatus; and adjusting a metering mode of the shooting apparatus according to the motion state information of the shooting apparatus.

18 Claims, 5 Drawing Sheets

(56) References Cited

FOREIGN PATENT DOCUMENTS

| | | | |
|---|---|---|---|
| CN | 101909152 | A | 12/2010 |
| CN | 103795917 | A | 5/2014 |
| CN | 104168425 | A | 11/2014 |
| CN | 104660893 | A | 5/2015 |
| CN | 104853066 | A | 8/2015 |
| CN | 104994297 | A | 10/2015 |
| CN | 105578062 | A | 5/2016 |
| CN | 105791673 | A | 7/2016 |
| CN | 105959594 | A | 9/2016 |
| CN | 107749955 | A | 3/2018 |
| CN | 108513641 | A | 9/2018 |
| CN | 110493524 | A | 11/2019 |
| EP | 1973341 | B1 | 10/2010 |
| JP | 2005115023 | A | 4/2005 |

\* cited by examiner

METERING ADJUSTMENT METHOD, APPARATUS AND DEVICE AND STORAGE MEDIUM

CROSS REFERENCE

The present application is a continuation of International Application No. PCT/CN2020/123052, filed on Oct. 23, 2020, which claims priority to Chinese patent application No. 2019108041958, filed on Aug. 28, 2019, which is incorporated herein by reference in its entirety.

TECHNICAL FIELD

Embodiments of the disclosure relate to unmanned aerial vehicle technologies, and in particular, to a metering adjustment method, apparatus and device and a storage medium.

BACKGROUND

In the prior art, the metering mode commonly used by a camera is an average metering mode or a center metering mode. In the field of aerial photography of unmanned aerial vehicles (UAVs), a camera on the UAV mostly adopts the center metering mode.

During the change of different scenes, if the center metering mode is adopted, overexposure or underexposure will not occur in the overall exposure of most of the captured pictures. If the spot metering mode is adopted for shooting, because the scene of the captured picture of the UAV changes too quickly, and there is a bright area and a dark area in a scene from time to time, when the spot metering mode is adopted, if a user does not manually change a metering position, the metering spot will stay in a certain area of the captured picture, which causes overexposure or underexposure of the captured video.

SUMMARY

In view of this, the disclosure provides a metering adjustment method, apparatus and device and a storage medium, so as to avoid the overexposure or underexposure of an image during video shooting.

According to a first aspect, an embodiment of the disclosure provides a metering adjustment method, including:

acquiring brightness information of a current image frame and a previous image frame captured by a shooting apparatus of an unmanned aerial vehicle (UAV);

determining whether the brightness information of the current image frame changes relative to the brightness information of the previous image frame;

if so, acquiring motion state information of the shooting apparatus; and adjusting a metering mode of the shooting apparatus according to the motion state information of the shooting apparatus.

According to a second aspect, an embodiment of the disclosure provides a metering adjustment apparatus, including:

a first acquisition module, configured to acquire brightness information of a current image frame and a previous image frame captured by a shooting apparatus of a UAV;

a judging module, configured to determine whether the brightness information of the current image frame changes relative to the brightness information of the previous image frame;

a second acquisition module, configured to: if so, acquire motion state information of the shooting apparatus; and a first adjustment module, configured to adjust a metering mode of the shooting apparatus according to the motion state information of the shooting apparatus.

According to a third aspect, an embodiment of the disclosure provides a metering adjustment apparatus, including:

one or more processors; and a memory, configured to store one or more programs, where the one or more programs, when executed by the one or more processors, cause the one or more processors to implement any of the metering adjustment methods described above.

According to a fourth aspect, a computer-readable storage medium stores a computer program. When the program is executed by the processor, any of the above metering adjustment methods is implemented.

According to the disclosure, brightness information of a current image frame and a previous image frame captured by the shooting apparatus of the UAV is acquired, it is determined whether the brightness information of the current image frame changes relative to the brightness information of the previous image frame, if so, motion state information of the shooting apparatus is acquired; and a metering mode of the shooting apparatus is adjusted according to the motion state information of the shooting apparatus. By means of the embodiments of the disclosure, the current metering mode of the shooting apparatus is adjusted in real time according to the change in the brightness information of the two adjacent image frames and the motion state information of the shooting apparatus. In this way, the overexposure and underexposure of the images in the video during the video shooting by the shooting apparatus are avoided. Therefore, the accurate video exposure mode is ensured.

DETAILED DESCRIPTION

The following further describes the disclosure in detail with reference to the accompanying drawings and embodiments. It may be understood that specific embodiments described herein are only used to explain the disclosure, but not to limit the disclosure. In addition, it should be further noted that, for ease of description, the accompanying drawings only show parts relevant to the disclosure rather than the entire structure.

It should be noted herein that although most shooting apparatuses (such as a camera) adopt an average metering mode or a center metering mode by default, when there is a strong contrast between light and dark in a scene, or when metering is correctly performed on a to-be-photographed object, a spot metering mode is to be adopted for shooting. However, during the shooting by adopting the spot metering mode, it is necessary to adjust the current metering mode of the camera in real time according to the shooting scene, so as to avoid the overexposure or underexposure of the captured video. For the situation, the embodiment of the disclosure provides a metering adjustment method to adjust the current metering mode of the camera in real time, to ensure the definition of the captured video. Certainly, it may be understood that the premise of the implementation of the embodiments of the disclosure is that the current metering mode of the camera is the spot metering mode.

Embodiment I

Figure 1:
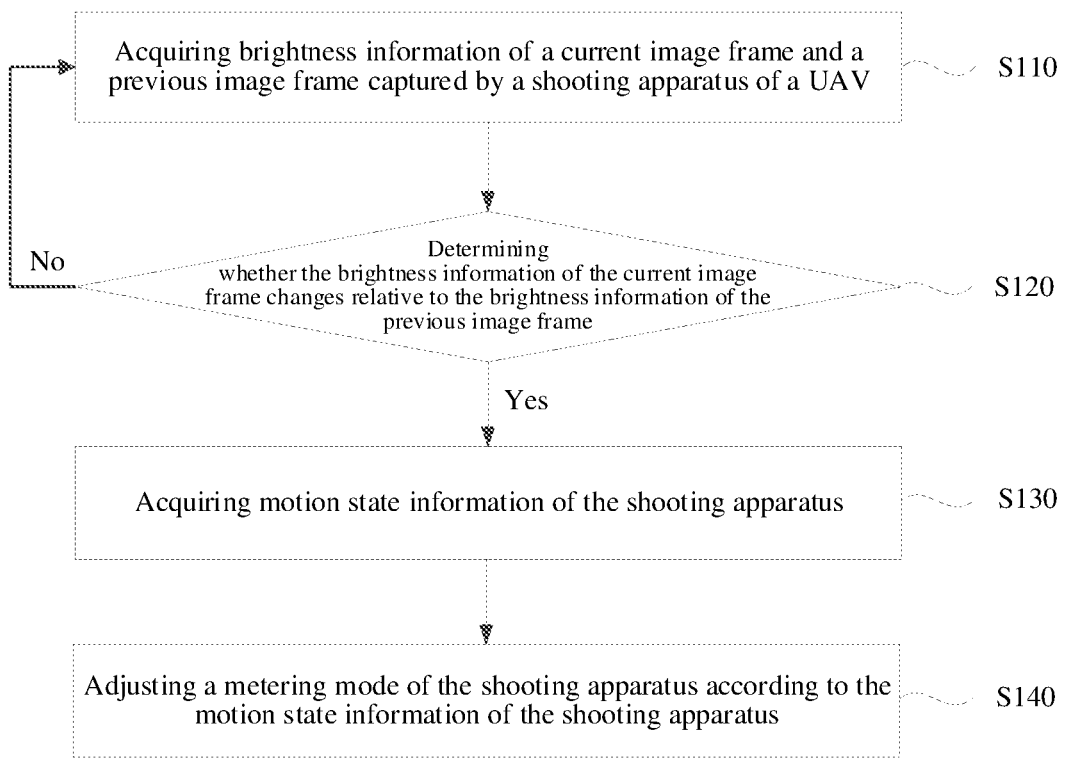
FIG. 1 is a flowchart of a metering adjustment method according to Embodiment I of the disclosure.

FIG. 1 is a flowchart of a metering adjustment method according to Embodiment I of the disclosure. This embodiment may be applicable to a case that a current metering mode of a shooting apparatus is adjusted in real time according to a change in a scene where a to-be-photographed image is located. The method may be performed by a metering adjustment apparatus. The method may be implemented by hardware and/or software, and may generally be integrated in a metering adjustment device. It should be understood that the metering adjustment device may be a shooting apparatus (a camera) or may be a flight controller or other processors in a UAV where the shooting apparatus is located. In other words, the metering adjustment method may be performed by the camera or may be performed by the flight controller or other processors.

It should be noted herein that the shooting apparatus in the metering adjustment method in this embodiment is applicable to the field of aerial photography. It may be understood that the shooting apparatus is a video or image shooting device. For example, the shooting apparatus may be a camera or may be other terminal devices equipped with the camera. Certainly, in a scene of a high-altitude operation such as aerial photography, in order to ensure the definition of the captured video, optionally, the shooting apparatus may be an aerial photography camera having high resolution.

As shown in FIG. 1, the method specifically includes the following steps.

S110: Acquiring brightness information of a current image frame and a previous image frame captured by a shooting apparatus of the UAV.

In the embodiment, the brightness information of the image may be acquired through real-time statistics by an image signal processing (ISP) chip embedded in the shooting apparatus, or may be acquired through statistics by an application (APP) associated with the shooting apparatus. It may be understood that the shooting apparatus is configured with the ISP chip that analyzes and processes the photographed images. Specifically, after the image is captured by the shooting apparatus, the ISP chip is used to analyze and process the image to determine the brightness information of the image.

The brightness information of the image may be exposure, brightness and contrast, which is not limited, and it is only necessary to determine, according to the brightness information, whether the brightness of the image changes. Optionally, the brightness information of the image is the brightness by way of example to describe the metering adjustment method. In the embodiment, the current image frame and the previous image frame may be understood as two adjacent image frames captured by the shooting apparatus.

Figure 2:
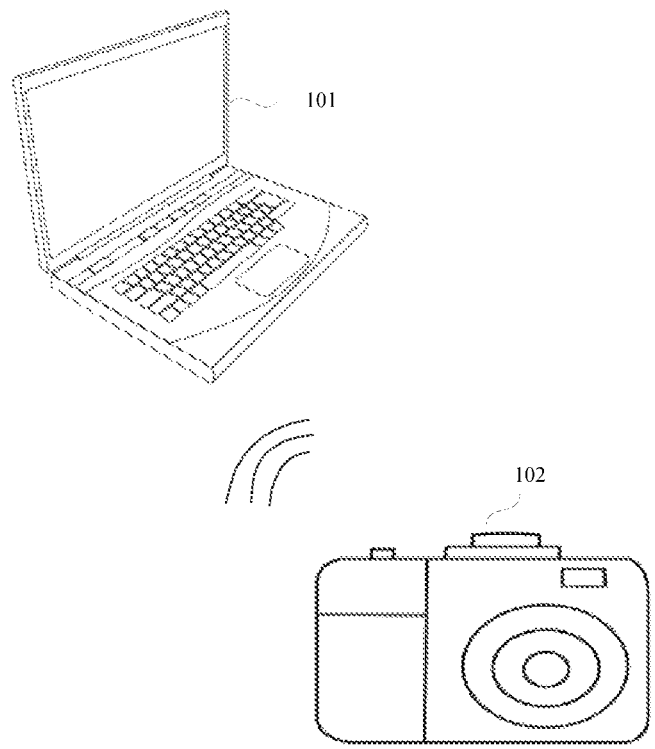
FIG. 2 is a schematic diagram showing connection between a shooting apparatus and a mobile terminal according to an embodiment of the disclosure.

Certainly, the image may also be analyzed and processed by using the APP in a mobile terminal communicatively connected with the shooting apparatus, to obtain the brightness information of the image. FIG. 2 is a schematic diagram showing connection between a shooting apparatus and a mobile terminal according to an embodiment of the disclosure. The mobile terminal is a notebook computer and the shooting apparatus is a camera by way of example, and a connection relationship between the notebook computer and the camera is described. As shown in FIG. 2, a wireless communication connection may be established between the notebook computer 101 and the camera 102. Certainly, a wireless communication module is required to be configured in the camera 102 and the notebook computer 101. After the camera 102 captures the current image frame, the current image frame is returned to a display screen of the notebook computer 101 by means of wireless communication. At this point, the APP installed on the notebook computer 101 may analyze and process the current image frame to obtain the brightness information of the current image frame. It may be understood that the images captured by the camera 102 are to be transmitted in real time to the notebook computer 101 with which the connection is established, and are displayed on the notebook computer 101. Certainly, the mobile terminal with which the camera 102 establishes the wireless communication connection is not limited to the notebook computer 101, but may further be any terminal equipped with a wireless communication module, such as an iPad, a smartphone and the like.

S120: Determining whether the brightness information of the current image frame changes relative to the brightness information of the previous image frame, if so, performing S130, and if not, performing S110.

In the embodiment, after the current image frame is captured by the shooting apparatus, the brightness information of the current image frame is compared with that of the previous image frame, to determine whether the brightness information between the current image frame and the previous image frame changes and determine, according to the change in the brightness information of the two adjacent image frames, a change in a scene where the image captured by the shooting apparatus is located. Specifically, if the brightness information of the two adjacent image frames changes, it indicates that the scene where the image captured by the shooting apparatus is located may change. However, if the brightness information of the two adjacent image frames does not change, it indicates that the scene where the image captured by the shooting apparatus is located does not change.

S130: Acquiring motion state information of the shooting apparatus.

The motion state information is used for representing a current state of the shooting apparatus. In the embodiment, the motion state information may include an in-motion state and a stationary state. It should be noted that the motion state information of the shooting apparatus may be determined according to the position information of the shooting apparatus. That is to say, the position information (denoted as the current position information) of the shooting apparatus corresponding to the current image frame is compared with the position information (denoted as the previous position information) of the shooting apparatus corresponding to the previous image frame. If the position information changes, it indicates that the motion state information of the shooting apparatus is the in-motion state. However, if the position information does not change, it indicates that the motion state information of the shooting apparatus is the stationary state.

S140: Adjusting the metering mode of the shooting apparatus according to the motion state information of the shooting apparatus.

In the embodiment, the metering mode of the shooting apparatus may include a spot metering mode, a center metering mode and an average metering mode. The spot metering mode means that a spot is metered, which depends on a weight range of the spot, and metering may be performed at any position in a captured picture. The average metering mode means that all spots in the entire captured picture are metered according to the same weight. The center metering mode refers to metering by allocating a weight to an area fixed in the center of the entire captured picture.

It should be noted herein that before the current metering mode of the shooting apparatus is adjusted, the current metering mode of the shooting apparatus is the spot metering mode. During the image shooting, if the brightness information of the two adjacent image frames captured by the shooting apparatus changes, and the position information of the shooting apparatus also changes, it is determined that the shooting apparatus is in an in-motion state. In other words, when the motion state information is the in-motion state, the current metering mode of the shooting apparatus is adjusted to the center metering mode or the average metering mode. When the current motion state is the stationary state, the current metering mode of the shooting apparatus is kept as the spot metering mode, so as to avoid the overexposure or underexposure of the image captured by the shooting apparatus.

According to the solution of this embodiment, the brightness information of the current image frame and the previous image frame captured by the shooting apparatus of the UAV is acquired, it is determined whether the brightness information of the current image frame changes relative to the brightness information of the previous image frame, and if so, motion state information of the shooting apparatus is acquired. According to the motion state information of the shooting apparatus, the metering mode of the shooting apparatus is adjusted. In this way, the current metering mode of the shooting apparatus is adjusted in real time according to the change in the brightness information of the two adjacent image frames and a position of the shooting apparatus. In this way, the overexposure and underexposure of the images in the video during the video shooting by the shooting apparatus are avoided. Therefore, the accurate video exposure mode is ensured.

Embodiment II

Figure 3:
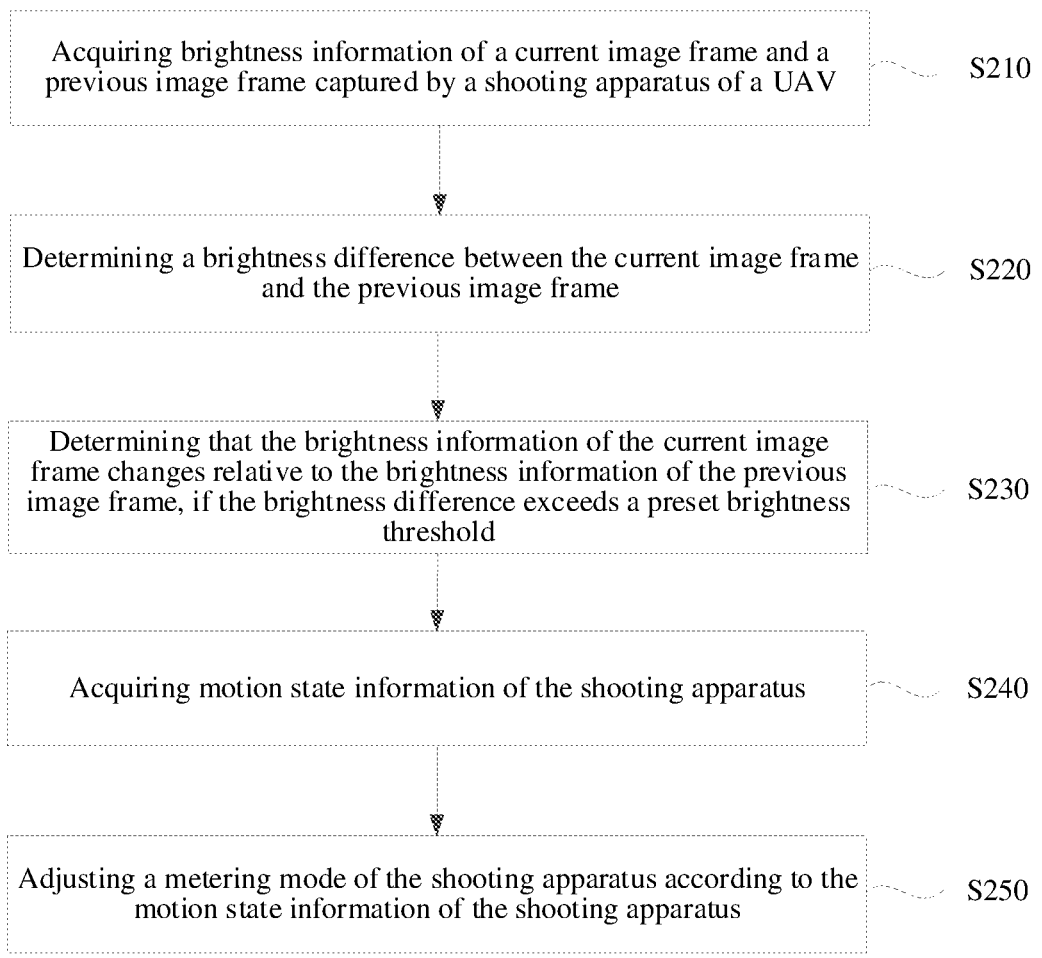
FIG. 3 is a flowchart of a metering adjustment method according to Embodiment II of the disclosure.

FIG. 3 is a flowchart of a metering adjustment method according to Embodiment II of the disclosure. On the basis of the above embodiment, this embodiment gives a specific description for determining whether the brightness information of the current image frame changes relative to the brightness information of the previous image frame. The brightness information of the image may be exposure, brightness and contrast. Optionally, in the embodiment, the metering adjustment method is described by using the brightness information of the image as the brightness by way of example. As shown in FIG. 3, the method specifically includes the following steps.

S210: Acquiring brightness information of a current image frame and a previous image frame captured by a shooting apparatus of a UAV.

S220: Determining a brightness difference between the current image frame and the previous image frame.

The brightness difference refers to a value obtained by acquiring a difference between the brightness value of the current image frame and the brightness value of the previous image frame. In the embodiment, after the brightness values of the current image frame and the previous image frame are obtained by using an ISP chip or an APP, the difference between the brightness value of the current image frame and the brightness value of the previous image frame is acquired to obtain the brightness difference between the current image frame and the previous image frame.

S230: If the brightness difference exceeds a preset brightness threshold, it is determined that the brightness information of the current image frame changes relative to the brightness information of the previous image frame.

The brightness threshold is a specific value of a preset brightness difference. It should be noted herein that the specific value of the brightness threshold may be set by a developer. In addition, a magnitude of the specific value of the brightness threshold is related to the sensitivity of the shooting apparatus. For example, if the sensitivity level of the shooting apparatus is relatively high, the specific value of the brightness threshold may be set to a relatively small value. On the contrary, if the sensitivity level of the shooting apparatus is relatively low, the specific value of the brightness threshold may be set to a relatively large value.

In the embodiment, it is determined whether the brightness difference between the current image frame and the previous image frame exceeds the brightness threshold. If the brightness difference between the two image frames exceeds the preset brightness threshold, the brightness information between the two image frames changes. If the brightness difference between the two image frames does not exceed the preset brightness threshold, the brightness information of the two image frames does not change. For example, assuming that the sensitivity level of the shooting apparatus is relatively high, the brightness threshold may be set to 2 candela/square meter ($cd/m^2$). That is to say, when the brightness difference between the current image frame and the previous image frame exceeds 2 $cd/m^2$, it may be determined that the brightness information between the two image frames changes. For another example, if the sensitivity level of the shooting apparatus is relatively low, the brightness threshold may be set to 8 $cd/m^2$. That is to say, when the brightness difference between the current image frame and the previous image frame exceeds 8 $cd/m^2$, it may be determined that the brightness information of the two image frames changes. Certainly, the setting of the brightness threshold may be adjusted according to the actual situation of the shooting apparatus and development requirements, which is not limited herein.

S240: Acquiring motion state information of the shooting apparatus.

S250: Adjusting the metering mode of the shooting apparatus according to the motion state information of the shooting apparatus.

According to the technical solution of this embodiment, on the basis of the above embodiment, it is determined, according to a comparison result of the brightness difference between the two image frames and the preset brightness threshold, that the brightness information of the two adjacent image frames changes, and then the motion state information of the shooting apparatus is acquired. Then the metering mode of the shooting apparatus is adjusted according to the motion state information. In this way, the overexposure and underexposure of the images in the video during the video shooting by the shooting apparatus are avoided. Therefore, the accurate exposure mode is ensured.

Embodiment III

Figure 4:
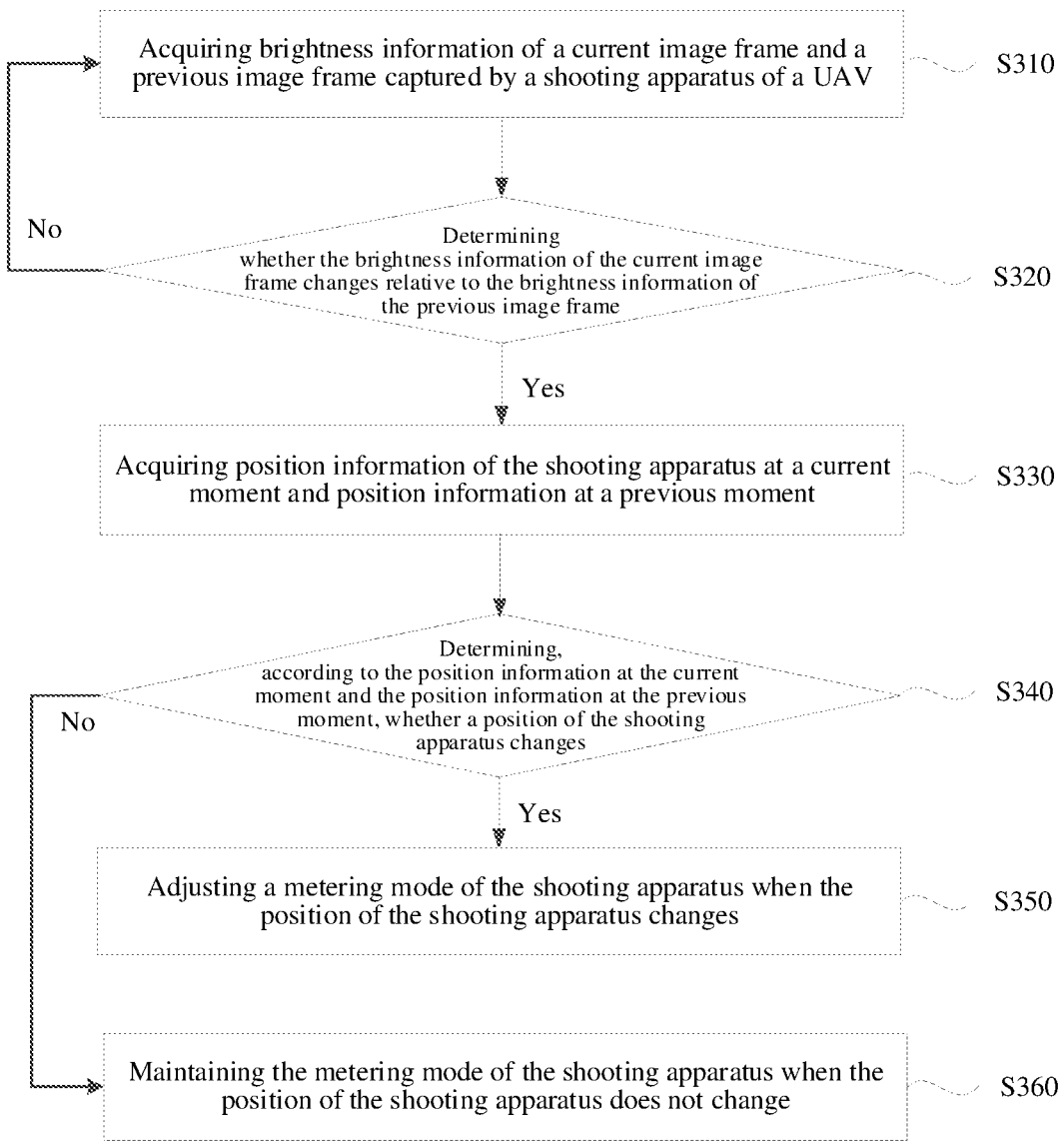
FIG. 4 is a flowchart of a metering adjustment method according to Embodiment III of the disclosure.

FIG. 4 is a flowchart of a metering adjustment method according to Embodiment III of the disclosure. On the basis of the above embodiments, this embodiment gives a further description for determining the current motion state of the shooting apparatus according to the difference between the current position and the previous position.

As shown in FIG. 4, the method includes the following steps.

S310: Acquiring brightness information of a current image frame and a previous image frame captured by a shooting apparatus of a UAV.

S320: Determining whether the brightness information of the current image frame changes relative to the brightness information of the previous image frame, if so, performing S330, and if not, performing S310.

S330: Acquiring position information of the shooting apparatus at a current moment and position information at a previous moment.

In the embodiment, when it is determined that the brightness difference between the current image frame and the previous image frame exceeds the brightness threshold, that is, when the brightness information between the two image frames changes, the position information of the shooting apparatus at the current moment (denoted as the current position information) and the position information at the previous moment (denoted as the previous position information) are acquired to determine whether the position of the shooting apparatus changes. It should be understood that due to being used in the field of aerial photography, the shooting apparatus may be naturally affected by the outside world during the shooting. When the current position of the shooting apparatus does not change, the brightness information of the current image frame and the previous image frame may change. For example, when the shooting apparatus shoots the previous image frame, the weather is sunny; and when the shooting apparatus shoots the current image frame, the weather becomes cloudy. Although the current position of the shooting apparatus does not change, the brightness information of the current image frame and the previous image frame may change. It may be understood that, in order to ensure the definition of the captured image, the current metering mode of the shooting apparatus is required to be effectively adjusted according to the change in the brightness information of the two adjacent image frames and the position of the shooting apparatus.

The position information of the shooting apparatus is determined in a manner including S10-S30.

S10: Detecting an angular velocity and a motion orientation in real time by using a gyroscope.

In the embodiment, the gyroscope is configured on the gimbal or the aircraft fuselage. It should be understood that the gyroscope is an instrument configured to measure the rotational angular velocity of an object and accurately determine an orientation of a moving object. In addition, the gyroscope will not change without being affected by the external force in a direction pointed by a rotation axis of a rotating object, which is a device configured to measure or maintain the direction.

One or more gyroscopes are configured on the fuselage of the UAV or the gimbal (the camera is to be carried on the gimbal), so as to accurately provide the angular velocity and the position information of the motion orientation. Certainly, the gyroscope may be mounted on the fuselage or the gimbal of the UAV, or one gyroscope may be mounted on each of the fuselage and the gimbal of the UAV. For the UAV for aerial photography, the solution that the gyroscope is mounted on the gimbal and the shooting apparatus directly reads data from the gyroscope mounted on the gimbal is better. For some industrial machines, there is no need to mount the gimbal on the industrial machine. At this point, the gyroscope may be directly mounted on the fuselage of the industrial machine, and the shooting apparatus directly reads data from the gyroscope mounted on the fuselage of the industrial machine. The shooting apparatus is a camera.

S20: Determining coordinate position information of a gimbal or an aircraft fuselage according to the angular velocity and the motion orientation.

In the embodiment, the coordinate position information of the gimbal or the aircraft fuselage is calculated by using the angular velocity and the motion orientation monitored in real time by the gyroscope. For the process of calculating the coordinate position information obtained from the angular velocity and the motion orientation, reference may be made to a description about the gyroscope in the prior art, and the details are not described herein again.

S30: Using the coordinate position information of the gimbal or the fuselage of the aircraft as the position information of the shooting apparatus.

The shooting apparatus is configured on the gimbal or the aircraft fuselage. It should be understood that the mounting position of the shooting apparatus on the UAV is the same as the mounting position of the gyroscope, which is also the gimbal or the aircraft fuselage. It may be understood that the coordinate position information of the gimbal or the aircraft fuselage determined by the angular velocity and the motion orientation of the gyroscope is the position information of the shooting apparatus.

S340: Determining, according to the position information at the current moment and the position information at the previous moment, whether the position of the shooting apparatus changes, if so, performing S350, and if not, performing S360.

In the embodiment, the position information at the current moment is information about the position where the shooting apparatus is currently located. The previous position is information about the position where the shooting apparatus is located before moving to the current position. In the embodiment, after the position information of the current position and the previous position of the shooting apparatus is obtained, a difference between the two pieces of position information is acquired to calculate an offset difference between the current position and the previous position, so as to determine the current motion state of the shooting apparatus according to the offset difference. The current motion state may include an in-motion state and a stationary state. Specifically, if the offset difference between the current position and the previous position exceeds a preset offset range, the current motion state of the shooting apparatus is determined as the in-motion state. If the offset difference between the current position and the previous position doesn't exceed the preset offset range, the current motion state of the shooting apparatus is determined as the stationary state.

S350: Adjusting the metering mode of the shooting apparatus when the position of the shooting apparatus changes.

In one embodiment, S350 may include steps S3501-S3502.

S3501: Determining an offset difference between the position information at the current moment and the position information at the previous moment.

In the embodiment, after the current position information and the previous position information of the shooting apparatus are determined by the angular velocity and the motion orientation detected in real time by using the gyroscope, the difference between the current position information and the previous position information is acquired to obtain the offset difference between the two positions.

S3502: Adjusting the metering mode of the shooting apparatus when the offset difference is greater than a preset threshold.

The preset threshold is a preset offset threshold, which may be set by the developer according to development requirements. It should be noted that the setting of the specific value of the preset threshold may also be related to the sensitivity level of the shooting apparatus. That is to say, a higher sensitivity level of the shooting apparatus leads to a larger preset threshold. For a specific explanation, reference is made to the description of the setting relationship between the brightness threshold and the brightness difference in the foregoing embodiment, and the details are not described herein again.

Specifically, the offset difference between the two positions of the shooting apparatus is compared with the preset threshold, and if the offset difference exceeds the preset threshold, it indicates that the motion state information of the shooting apparatus is the in-motion state. If the offset difference does not exceed the preset threshold, it indicates that the motion state information of the shooting apparatus is the stationary state. When the motion state information is the in-motion state, the metering mode of the shooting apparatus is adjusted from the spot metering mode to the center metering mode or the average metering mode, to ensure an accurate exposure mode and avoid the overexposure and underexposure during the shooting of the shooting apparatus.

In one embodiment, S350 may include: adjusting the metering mode of the shooting apparatus to a center metering mode or an average metering mode when the position of the shooting apparatus changes.

In the embodiment, when the position information of the shooting apparatus at the current moment is different from the position information at the previous moment, it indicates that the position of the shooting apparatus changes, and the current metering mode of the shooting apparatus may be adjusted. It should be noted that as long as the position of the shooting apparatus changes, the metering mode of the shooting apparatus is adjusted without considering whether the offset difference of the shooting apparatus reaches the preset threshold.

S360: Maintaining the metering mode of the shooting apparatus when the position of the shooting apparatus does not change, where the metering mode of the shooting apparatus is a spot metering mode.

Certainly, when the position of the shooting apparatus does not change, it is not necessary to adjust the current metering mode of the shooting apparatus, that is to say, the metering mode of the shooting apparatus is still the spot metering mode.

According to the technical solution of this embodiment, on the basis of the above embodiments, the position information of the shooting apparatus is determined by the mounting position of the gyroscope on the UAV. In this way, the accurate calculation of the position information of the shooting apparatus is achieved, and the accuracy of adjusting the current metering mode of the shooting apparatus is ensured.

Embodiment IV

Figure 5:
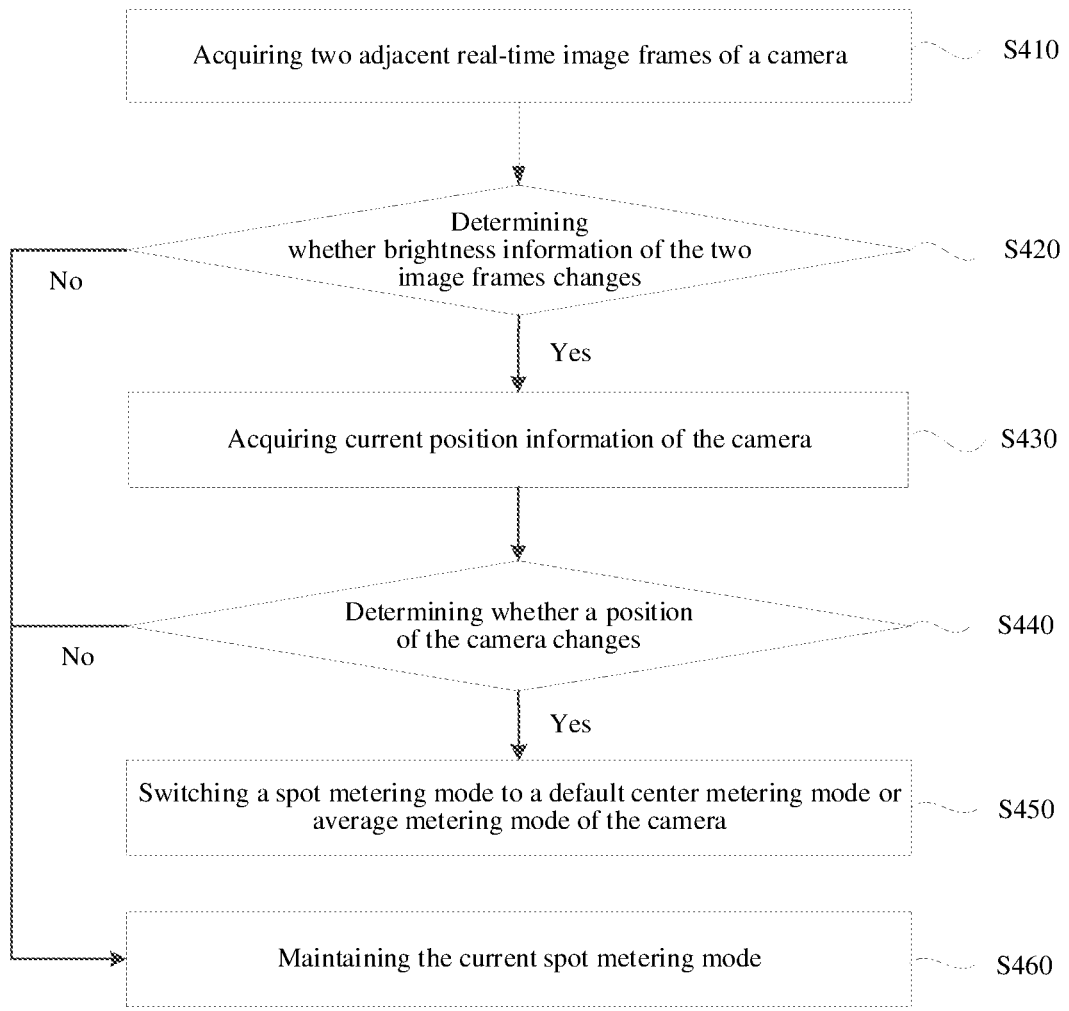
FIG. 5 is a flowchart of a metering adjustment method according to Embodiment IV of the disclosure.

FIG. 5 is a flowchart of a metering adjustment method according to Embodiment IV of the disclosure. In the embodiment, on the basis of the above embodiments, the shooting apparatus is a camera configured on the fuselage or the gimbal of the UAV to capture images, and the current metering mode is adjusted in real time according to the scene captured by the camera. Specifically, as shown in FIG. 5, the method includes the following steps.

S410: Acquiring two adjacent real-time image frames of the camera.

In the embodiment, the two adjacent real-time image frames are the current image frame and the previous image frame in the above embodiment.

S420: Determining whether brightness information of the two image frames changes, if so, performing step S430, and if not, performing step S460.

S430: Acquiring current position information of the camera.

In the embodiment, an angular velocity and a direction change of the camera are detected in real time by using the gyroscope, and the current coordinate position information of the gimbal or the fuselage is calculated in real time, which is denoted as f (x1, x2, x3). Then the camera may read the coordinate position information f (x1, x2, x3) of the gyroscope in real time. When the previous position of the gimbal or the fuselage is A, the camera acquires coordinates (z1, z2, z3) of the position A from the gyroscope in real time.

S440: Determining whether a position of the camera changes, if so, performing step S450, and if not, performing step S460.

In the embodiment, an offset difference between the previous position A and the current position f is calculated by using the camera, which is denoted as (z1−x1, z2−x2, z3−x3), and then it is determined whether the offset difference is within an offset range preferably set by the camera. If the offset difference is greater than the offset range set by the camera, the spot metering mode of the camera is switched to the default center metering mode or average metering mode in the camera. If the offset difference is within the offset range set by the camera, the shooting apparatus continues to maintain the current spot metering mode. The offset range is the offset threshold in the above embodiment. For example, assuming that the offset difference set by the camera is (o1, o2, o3), if |(z1−x1, z2−x2, z3−x3)|>|(o1, o2, o3)|, then it indicates that the offset difference of the gimbal or the fuselage is greater than the preset offset range of the camera, and the camera is switched from the spot metering mode to the center metering mode or the average metering mode.

Certainly, in the actual operation process, a user may set the offset range by using the App, or may set the offset range by using the flight control system of the UAV or the camera itself.

S450: Switching the spot metering mode to a default center metering mode or average metering mode of the camera.

S460: Maintaining the current spot metering mode.

It should be noted herein that the metering adjustment method in the above embodiment may be performed by the camera or may be performed by the flight controller or other processors in the UAV. The flight controller or other processors read the position information from the gyroscope in real time, and calculate, in real time, whether the position offset of the gimbal or the fuselage is within the set offset range. If the position offset is greater than the offset range, the camera is switched from the spot metering mode to the center metering mode or the average metering mode.

According to the technical solution of this embodiment, when the user currently adopts the spot metering mode to capture an image and the scene in which the image is captured changes, the spot metering mode of the camera may be switched to the center metering mode or the average metering mode according to the change in the brightness parameters of the two adjacent image frames and the position of the camera. In this way, the overexposure or underexposure is avoided during the video shooting, and the accurate video exposure mode is ensured.

Embodiment V

Figure 6:
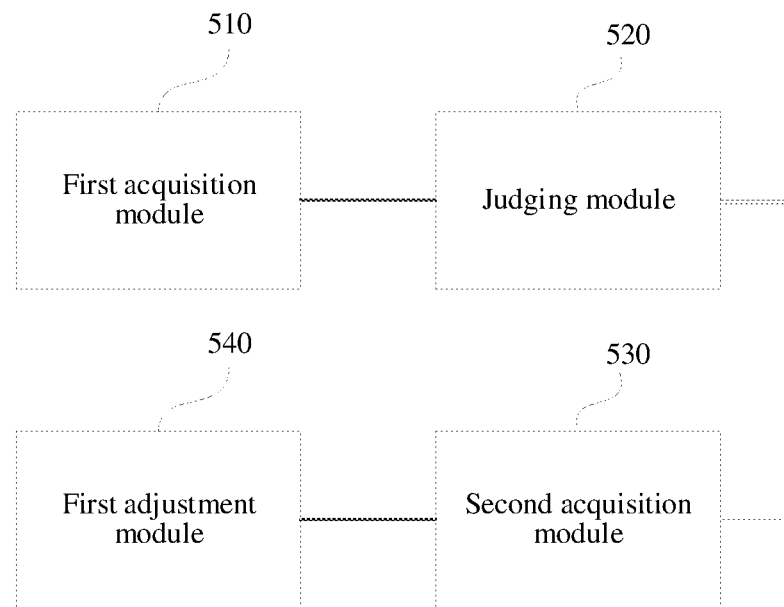
FIG. 6 is a structural block diagram of a metering adjustment apparatus according to Embodiment V of the disclosure.

FIG. 6 is a structural block diagram of a metering adjustment apparatus according to Embodiment V of the disclosure. The apparatus is applicable to a case that the current metering mode of a shooting apparatus is adjusted in real time according to the change in the image shooting scene. The apparatus may be implemented by hardware/software and may be generally integrated in a metering adjustment device. As shown in FIG. 6, the apparatus includes a first acquisition module 510, a judging module 520, a second acquisition module 530 and a first adjustment module 540.

The first acquisition module 510 is configured to acquire brightness information of a current image frame and a previous image frame captured by the shooting apparatus of a UAV.

The judging module 520 is configured to determine whether the brightness information of the current image frame changes relative to the brightness information of the previous image frame.

The second acquisition module 530 is configured to acquire motion state information of the shooting apparatus if the brightness information of the current image frame changes.

The first adjustment module 540 is configured to adjust a metering mode of the shooting apparatus according to the motion state information of the shooting apparatus.

According to the solution of this embodiment, the brightness information of the current image frame and the previous image frame captured by the shooting apparatus of the UAV is acquired, it is determined whether the brightness information of the current image frame changes relative to the brightness information of the previous image frame, and if so, motion state information of the shooting apparatus is acquired. According to the motion state information of the shooting apparatus, the metering mode of the shooting apparatus is adjusted. In this way, the current metering mode of the shooting apparatus is adjusted in real time according to the change in the brightness information of the two adjacent image frames and the motion state information of the shooting apparatus. In this way, the overexposure and underexposure of the images in the video during the video shooting by the shooting apparatus are avoided. Therefore, the accurate exposure mode of the video is ensured.

On the basis of the above embodiment, the judging module includes:

a first determining unit, configured to determine a brightness difference between the current image frame and the previous image frame; and a second determining unit, configured to determine that the brightness information of the current image frame changes relative to the brightness information of the previous image frame if the brightness difference exceeds a preset brightness threshold.

On the basis of the above embodiment, the second acquisition module includes:

a first acquisition unit, configured to acquire position information of the shooting apparatus at a current moment and position information at a previous moment; and a third determining unit, configured to determine, according to the position information at the current moment and the position information at the previous moment, whether a position of the shooting apparatus changes.

On the basis of the above embodiment, the first adjustment module includes:

a first adjustment unit, configured to adjust the metering mode of the shooting apparatus when the position of the shooting apparatus changes.

On the basis of the above embodiment, the first adjustment unit includes:

a first determining subunit, configured to determine an offset difference between the position information at the current moment and the position information at the previous moment; and a first adjustment subunit, configured to adjust the metering mode of the shooting apparatus when the offset difference is greater than the preset threshold.

On the basis of the above embodiment, the first adjustment unit includes:

a second adjustment subunit, configured to adjust the metering mode of the shooting apparatus to a center metering mode or an average metering mode when the position of the shooting apparatus changes.

On the basis of the above embodiment, the metering adjustment apparatus further includes:

a second adjustment module, configured to maintain the metering mode of the shooting apparatus when the position of the shooting apparatus does not change, where the metering mode of the shooting apparatus is a spot metering mode.

On the basis of the above embodiment, the second adjustment subunit specifically including:

detecting an angular velocity and a motion orientation in real time by using a gyroscope;

determining coordinate position information of a gimbal or a fuselage of an aircraft according to the angular velocity and the motion orientation; and using the coordinate position information of the gimbal or the fuselage of the aircraft as the position information of the shooting apparatus.

The above metering adjustment apparatus may perform the metering adjustment method provided in any embodiment of the disclosure, and has the corresponding functional modules for performing the method and beneficial effects.

Embodiment VI

Figure 7:
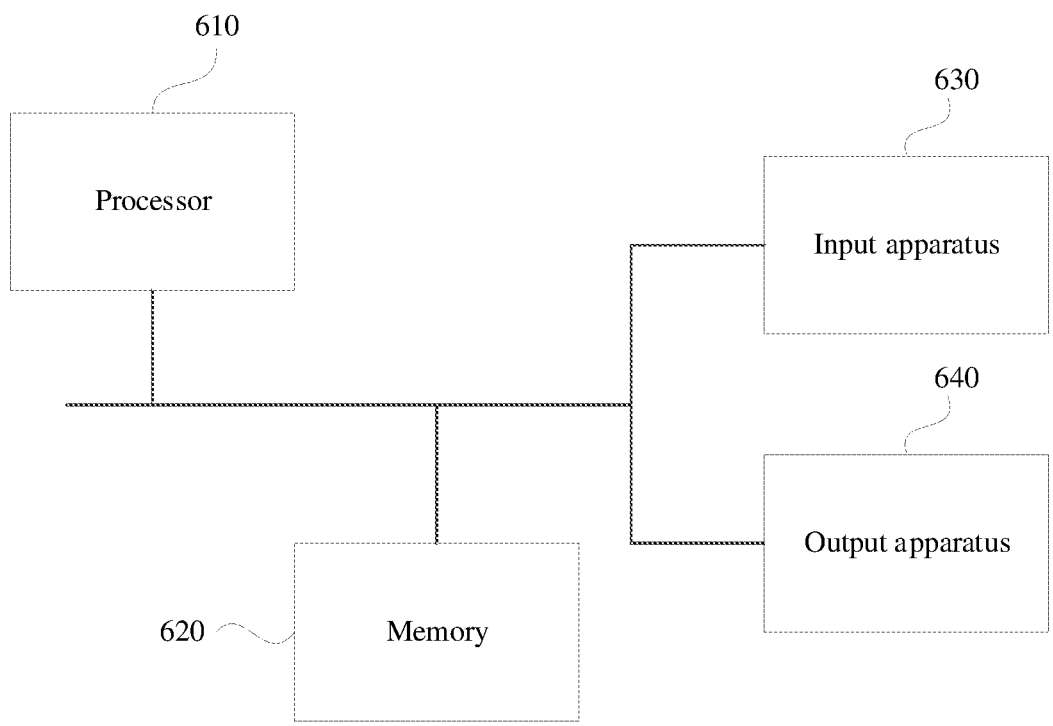
FIG. 7 is a schematic structural diagram of hardware of a metering adjustment device according to Embodiment VI of the disclosure.

FIG. 7 is a schematic structural diagram of hardware of a metering adjustment device according to Embodiment VI of the disclosure. The metering adjustment device in Embodiment VI of the disclosure is a camera by way of example for description. As shown in FIG. 7, the camera provided in Embodiment VI of the disclosure includes: a processor 610, a memory 620, an input apparatus 630 and an output apparatus 640. One or more processors 610 may be disposed in the camera. In FIG. 7, one processor 610 is used as an example. The processor 610, the memory 620, the input apparatus 630 and the output apparatus 640 in the camera may be connected by a bus or in other manners. In FIG. 7, the connection by the bus is used as an example.

The memory 620 in the camera is used as a computer-readable storage medium for storing one or more programs. The programs may be a software program, a computer-executable program and a module, such as program instructions/modules for performing the metering adjustment method provided in Embodiment I to Embodiment IV of the disclosure (for example, the modules in the metering adjustment apparatus shown in FIG. 6 include: a first acquisition module 510, a judging module 520, a second acquisition module 530 and a first adjustment module 540). The processor 610 executes various functional applications and data processing of the camera by running the software program, the instructions and the modules stored in the memory 620. That is to say, the metering adjustment method in the foregoing method embodiments is implemented.

The memory 620 may include a program storage area and a data storage area. The program storage area may store an operating system and an application program required for at least one function. The data storage area may store data created according to use of the device and the like. In addition, the memory 620 may include a high-speed random access memory, and may further include a non-volatile memory, such as at least one magnetic disk memory device, a flash memory device, or other non-volatile solid-state memory devices. In some embodiments, the memory 620 may further include remote memories disposed relative to the processor 610, and these remote memories may be connected to a device via a network. An example of the foregoing network includes, but is not limited to, the Internet, an intranet, a local area network, a mobile communication network and a combination thereof.

The input apparatus 630 may be configured to receive numeral or character information entered by the user, to generate key signal inputs related to user setting and function control of a terminal device. The output apparatus 640 may include a display device such as a display screen.

In addition, when one or more programs included in the above camera are executed by the one or more processors 610, the programs causes the processor to perform the following operations:
acquiring brightness information of a current image frame and a previous image frame captured by a shooting apparatus of a UAV; determining whether the brightness information of the current image frame changes relative to the brightness information of the previous image frame; if so, acquiring motion state information of the shooting apparatus; and adjusting a metering mode of the shooting apparatus according to the motion state information of the shooting apparatus.

The above metering adjustment device may perform the metering adjustment method provided in any embodiment of the disclosure, and has the corresponding functional modules for performing the method and beneficial effects.

Embodiment VII

Embodiment VII of the disclosure further provides a computer-readable storage medium storing a computer program. When the program is executed by a processor, the metering adjustment method provided in the embodiments of the disclosure is implemented. The method includes:
acquiring brightness information of a current image frame and a previous image frame captured by a shooting apparatus of a UAV; determining whether the brightness information of the current image frame changes relative to the brightness information of the previous image frame; if so, acquiring motion state information of the shooting apparatus; and adjusting a metering mode of the shooting apparatus according to the motion state information of the shooting apparatus.

The computer storage medium in the embodiments of the disclosure may adopt any combination of one or more computer-readable media. The computer-readable medium may be a computer-readable signal medium or a computer-readable storage medium. The computer-readable storage medium may be, but is not limited to, an electrical, magnetic, optical, electromagnetic, infrared, or semiconductor system, apparatus or device, or any combination thereof, for example. More specific examples (a non-exhaustive list) of the computer-readable storage medium include: an electrical connection by one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), a optical memory device, a magnetic storage device or any appropriate combination thereof. In this document, the computer-readable storage medium may be any tangible medium including or storing a program. The program may be used by or in combination with an instruction execution system, apparatus or device.

The computer-readable signal medium may include a data signal included in a baseband or transmitted as a part of a carrier, which carries computer-readable program code. Such a transmitted data signal may have various forms, including but not limited to an electromagnetic signal, an optical signal or any appropriate combination thereof. The computer-readable signal medium may further be any computer-readable medium other than the computer-readable storage medium. The computer-readable medium may be used for sending, propagating or transmitting a program used by or in combination with an instruction execution system, apparatus or device.

The program code included in the computer-readable medium may be transmitted by using any suitable medium, including but not limited to a wireless medium, an electric wire, an optical cable, an RF medium or any appropriate combination thereof.

Computer program code for performing the operation of the disclosure may be written by using one or more programming languages or a combination thereof. The programming language includes an object-oriented programming language such as Java, Smalltalk, C++, and a conventional procedural programming language such as "C" Language or a similar programming language. The program code may be fully executed on a user computer or partially executed on a user computer, or may be executed as an independent software package, or may be partially executed on a user computer and partially executed on a remote computer, or may be fully executed on a remote computer or a server. In a situation involving the remote computer, the remote computer may be connected to the user computer by using any type of network including a local area network (LAN) or a wide area network (WAN), or may be connected to an external computer (for example, connected to the external computer through the Internet by using an Internet service provider).

It is to be note that the above are merely preferred embodiments of the disclosure and applied technical principles. Those skilled in the art will understand that the disclosure is not limited to the specific embodiments described herein, and various obvious changes, readjustments and substitutions can be made by those skilled in the art without departing from the protection scope of the disclosure. Therefore, although the disclosure is described in detail through the foregoing embodiments, the disclosure is not limited to the foregoing embodiments, and may also include more other equivalent embodiments without departing from the concept of the disclosure. The scope of the disclosure is determined by that of the appended claims.

What is claimed is:

1. A metering adjustment method, comprising:
   acquiring brightness information of a current image frame and a previous image frame captured by a shooting apparatus of an unmanned aerial vehicle (UAV), the brightness information of the current image frame and the brightness information of the previous image frame are acquired by an image signal process chip;
   determining whether the brightness information of the current image frame changes relative to the brightness information of the previous image frame;
   when the brightness information of the previous image frame is changed, acquiring motion state information of the shooting apparatus; and
   adjusting a metering mode of the shooting apparatus according to the motion state information of the shooting apparatus:
   wherein the acquiring motion state information of the shooting apparatus comprises:
   acquiring position information of the shooting apparatus at a current moment and position information at a previous moment; and
   determining, according to the position information at the current moment and the position information at the previous moment, whether a position of the shooting apparatus changes.

2. The method according to claim 1, wherein the determining whether the brightness information of the current image frame changes relative to the brightness information of the previous image frame comprises:
   determining a brightness difference between the current image frame and the previous image frame; and
   determining that the brightness information of the current image frame changes relative to the brightness information of the previous image frame, if the brightness difference exceeds a preset brightness threshold.

3. The method according to claim 1, wherein the adjusting a metering mode of the shooting apparatus according to the motion state information of the shooting apparatus comprises:
   adjusting the metering mode of the shooting apparatus when the position of the shooting apparatus changes.

4. The method according to claim 3, wherein the adjusting the metering mode of the shooting apparatus when the position of the shooting apparatus changes comprises:
   determining an offset difference between the position information at the current moment and the position information at the previous moment; and
   adjusting the metering mode of the shooting apparatus when the offset difference is greater than a preset threshold.

5. The method according to claim 3, wherein the adjusting the metering mode of the shooting apparatus when the position of the shooting apparatus changes comprises:
   adjusting the metering mode of the shooting apparatus to a center metering mode or an average metering mode when the position of the shooting apparatus changes.

6. The method according to claim 1, further comprising:
   maintaining the metering mode of the shooting apparatus when the position of the shooting apparatus does not change, wherein the metering mode of the shooting apparatus is a spot metering mode.

7. The method according to claim 1, wherein the position information of the shooting apparatus is determined in a manner comprising:
   detecting an angular velocity and a motion orientation in real time by using a gyroscope;
   determining coordinate position information of a gimbal or a fuselage of an aircraft according to the angular velocity and the motion orientation; and
   using the coordinate position information of the gimbal or the fuselage of the aircraft as the position information of the shooting apparatus.

8. A metering adjustment apparatus, comprising at least one processor; and
   a memory, communicatively connected with the at least one processor, wherein the memory stores instructions executable by the at least one processor, the instructions, when executed by the at least one processor, causing the at least one processor to:
   acquire brightness information of a current image frame and a previous image frame captured by a shooting apparatus of an unmanned aerial vehicle (UAV);
   determine whether the brightness information of the current image frame changes relative to the brightness information of the previous image frame;
   when the brightness information of the previous image frame is changed, acquire motion state information of the shooting apparatus; and
   adjust a metering mode of the shooting apparatus according to the motion state information of the shooting apparatus;
   acquire position information of the shooting apparatus at a current moment and position information at a previous moment; and
   determine, according to the position information at the current moment and the position information at the previous moment, whether a position of the shooting apparatus changes.

9. The apparatus according to claim 8, wherein the processor is further configured to:
   determine a brightness difference between the current image frame and the previous image frame; and
   determine that the brightness information of the current image frame changes relative to the brightness information of the previous image frame, if the brightness difference exceeds a preset brightness threshold.

10. The apparatus according to claim 8, wherein the processor is further configured to:
    adjust the metering mode of the shooting apparatus when the position of the shooting apparatus changes.

11. The apparatus according to claim 10, wherein the processor is further configured to:
    determine an offset difference between the position information at the current moment and the position information at the previous moment; and
    adjust the metering mode of the shooting apparatus when the offset difference is greater than a preset threshold.

12. The apparatus according to claim 10, wherein the processor is further configured to:

adjust the metering mode of the shooting apparatus to a center metering mode or an average metering mode when the position of the shooting apparatus changes.

13. The apparatus according to claim 8, wherein the processor is further configured to:
maintain the metering mode of the shooting apparatus when the position of the shooting apparatus does not change, wherein the metering mode of the shooting apparatus is a spot metering mode.

14. The apparatus according to claim 8, wherein the processor is further configured to:
detect an angular velocity and a motion orientation in real time by using a gyroscope;
determine coordinate position information of a gimbal or a fuselage of an aircraft according to the angular velocity and the motion orientation; and
use the coordinate position information of the gimbal or the fuselage of the aircraft as the position information of the shooting apparatus.

15. A non-transitory computer readable memory medium storing program instructions executable by processing circuitry to cause a processor to:
acquire brightness information of a current image frame and a previous image frame captured by a shooting apparatus of an unmanned aerial vehicle (UAV);
determine whether the brightness information of the current image frame changes relative to the brightness information of the previous image frame;
when the brightness information of the previous image frame is changed, acquire motion state information of the shooting apparatus; and
adjust a metering mode of the shooting apparatus according to the motion state information of the shooting apparatus;
acquire position information of the shooting apparatus at a current moment and position information at a previous moment; and
determine, according to the position information at the current moment and the position information at the previous moment, whether a position of the shooting apparatus changes.

16. The non-transitory memory medium according to claim 15, wherein the program instructions are further configured to:
determine a brightness difference between the current image frame and the previous image frame; and
determine that the brightness information of the current image frame changes relative to the brightness information of the previous image frame, if the brightness difference exceeds a preset brightness threshold.

17. The non-transitory memory medium according to claim 15, wherein the program instructions are further configured to:
determine an offset difference between the position information at the current moment and the position information at the previous moment; and
adjust the metering mode of the shooting apparatus when the offset difference is greater than a preset threshold.

18. The non-transitory memory medium according to claim 17, wherein the program instructions are further configured to:
detect an angular velocity and a motion orientation in real time by using a gyroscope;
determine coordinate position information of a gimbal or a fuselage of an aircraft according to the angular velocity and the motion orientation; and
use the coordinate position information of the gimbal or the fuselage of the aircraft as the position information of the shooting apparatus.

* * * * *